(12) United States Patent
Chen et al.

(10) Patent No.: US 11,379,635 B2
(45) Date of Patent: Jul. 5, 2022

(54) METHOD OF SOLVING CLOSED FORM EXACT SOLUTION FOR THE FIELD GENERATED BY A FINITE-LENGTH HARMONIC LINEAR CURRENT SOURCE IN A WHOLE SPACE

(71) Applicant: JIANGSU UNIVERSITY, Zhenjiang (CN)

(72) Inventors: Wenqing Chen, Zhenjiang (CN); Shu Yan, Zhenjiang (CN); Guoqiang Xue, Beijing (CN)

(73) Assignee: Jiangsu University, Jiangsu (CN)

( * ) Notice: Subject to any disclaimer, the term of this patent is extended or adjusted under 35 U.S.C. 154(b) by 395 days.

(21) Appl. No.: 16/627,837

(22) PCT Filed: Jan. 4, 2019

(86) PCT No.: PCT/CN2019/070322
§ 371 (c)(1),
(2) Date: Dec. 31, 2019

(87) PCT Pub. No.: WO2020/015339
PCT Pub. Date: Jan. 23, 2020

(65) Prior Publication Data
US 2021/0406418 A1 Dec. 30, 2021

(30) Foreign Application Priority Data

Jul. 16, 2018 (CN) .......................... 201810778133.X

(51) Int. Cl.
*G06F 30/20* (2020.01)
*G06F 111/10* (2020.01)
(52) U.S. Cl.
CPC .......... *G06F 30/20* (2020.01); *G06F 2111/10* (2020.01)

(58) Field of Classification Search
CPC ............................. G06F 30/20; G06F 2111/10
See application file for complete search history.

(56) References Cited

U.S. PATENT DOCUMENTS

| 7,558,706 B1* | 7/2009 | Hoyler | G06F 30/23 703/2 |
| 2013/0289955 A1* | 10/2013 | Vold | G06F 30/367 703/2 |

(Continued)

FOREIGN PATENT DOCUMENTS

| CN | 104471443 A | 3/2015 |
| CN | 105974487 A | 9/2016 |

(Continued)

OTHER PUBLICATIONS

Chowdhary K, Robinson AC. Evaluation of Magnetic Vector Potential in 2D and 3D Models. InCSRI Summer Proceedings 2007 Dec. 6, 2007 (p. 274). (Year: 2007).*

(Continued)

*Primary Examiner* — Chuen-Meei Gan
(74) *Attorney, Agent, or Firm* — Dilworth IP, LLC

(57) ABSTRACT

A method of solving closed form exact solution for the field generated by a finite-length harmonic linear current source in a whole space. The vector magnetic potential formula of the finite-length harmonic linear current source containing a source point position vector is listed, the uniform current is subjected to cosine processing, and the current in the vector magnetic potential formula of the harmonic linear current source is expressed by a cosine function. The vector magnetic potential formula can be subjected to quadrature by an elementary function to obtain the closed form exact solution for the field generated by the finite-length harmonic linear current source in whole space. The cosine expression of the linear current source can better reflect the fundamental attributes of the electric dipole and harmonic current of (Continued)

linear current source in the conductive whole space. The obtained closed form exact solution is applicable in the all zone.

7 Claims, 2 Drawing Sheets

(56) References Cited

U.S. PATENT DOCUMENTS

| | | |
|---|---|---|
| 2015/0081219 A1 | 3/2015 | Pugh et al. |
| 2015/0123835 A1 | 5/2015 | Sokolowsky et al. |

FOREIGN PATENT DOCUMENTS

| | | |
|---|---|---|
| CN | 106842334 A | 6/2017 |
| CN | 109063281 A | 12/2018 |

OTHER PUBLICATIONS

3D Data-Space OCCAM Inversion for Controlled Source Extremely Low Frequency Method, A Dissertation by Meng Cao, 2016, 103 pages.

\* cited by examiner

METHOD OF SOLVING CLOSED FORM EXACT SOLUTION FOR THE FIELD GENERATED BY A FINITE-LENGTH HARMONIC LINEAR CURRENT SOURCE IN A WHOLE SPACE

I. FIELD OF THE INVENTION

The present invention belongs to the artificial source electromagnetic exploration in frequency domain, and in particular, to a method of solving closed form exact solution for the field generated by a finite-length harmonic linear current source in a whole space.

II. BACKGROUND OF THE INVENTION

In the field of geophysical electromagnetic exploration, a processing method of electric dipole approximation is adopted for a harmonic linear current source: the source current is considered as being uniformly distributed, and the linear current source is considered as a point source, so as to obtain a closed form solution. Such a dipole approximation formula is suitable for use in a far zone.

With the development of exploration methods, in a process of advancing of an observation point from a far zone to a near zone through a middle zone, it is necessary to obtain exact solution for the field generated by a finite-length harmonic linear current source as the theoretical basis for the development of all zone exploration. However, integral expression of exact solution for the field generated by the finite-length harmonic linear current source in assumed uniform distribution cannot realize closed form quadrature. Although closed evaluation may be carried out for integration of exact solution for the field generated by a finite-length current source in sinusoidal distribution, for which the terminal current is set to 0, sinusoidal expression is inconsistent with the actual current distribution of the geophysical harmonic linear current source.

III. SUMMARY OF THE INVENTION

In accordance with the shortages and defects of the prior art, the present invention provides a method of solving closed form exact solution for the field generated by a finite-length harmonic linear current source in a whole space, wherein the key is cosinoidal expression of the uniform current distribution with the purpose of carrying out elementary quadrature for the integral formula of a field containing a source point position vector, and the closed form exact solution for the field generated by a finite-length harmonic linear current source in the whole space is not only suitable for the all zone, but also can express essential attributes of the harmonic current being distributed along the line.

The technical solution adopted in the present invention is as following:

a method of solving closed form exact solution for the field generated by a finite-length harmonic linear current source in a whole space includes:
  step 1, listing integral formula for vector magnetic potential containing a source point position vector of a finite-length harmonic linear current source;
  step 2, performing a cosine processing for the uniform current;
  step 3, expressing current in the integral formula for vector magnetic potential containing the source point position vector by a cosine function; and
  step 4, solving the integral containing the source point position vector to obtain the closed form exact solution for the field generated by the finite-length harmonic linear current source in the whole space.

Further, taking a cylindrical-coordinate system, a middle point of the linear current source coincides with coordinates origin O and is placed along the z axis; as shown in FIG. 1, in a uniform, linear, isotropic and time-invariant unbounded medium, a vector magnetic potential formula A(r) of the harmonic linear current source containing the source point position vector is listed:

$$A(r) = \hat{z} A_z(\rho, z) = \hat{z}\frac{\mu}{4\pi} \int_{-l/2}^{l/2} \frac{I(z') e^{-jk|r-r'|}}{|r-r'|} dz' = \hat{z}\frac{\mu}{4\pi} \int_{-l/2}^{l/2} \frac{I(z') e^{-jk\sqrt{\rho^2+(z-z')^2}}}{\sqrt{\rho^2+(z-z')^2}} dz' = \hat{z}\frac{\mu}{4\pi} \int_{-l/2}^{l/2} \frac{I(z') e^{-jkR}}{R} dz' \quad (1a)$$

where $A_z(\rho,z)$ is the z component of the vector magnetic potential A(r); due to the symmetry, $A_z$ is only the function of $(\rho,z)$ among three coordinate variables $(\rho,\varphi,z)$ of the cylindrical-coordinate system, $\hat{z}$ is the unit vector along the z-axis direction, r is the field point position vector, r' is the source point position vector, z' is the source point position coordinate, y is the permeability, l is the length of the linear current source, I(z') is the current distribution function, j is the imaginary unit, R is the distance from the source point to the field point, k is the wave number, and p is the radial distance in the cylindrical-coordinate system.

$$k = \sqrt{(\omega^2 \mu \varepsilon - j\omega\mu\sigma)} = \sqrt{2\pi f \mu (2\pi f \varepsilon - j\sigma)} \quad (1b)$$

where $\omega$ is the angular frequency (in the unit of rad/s) of the source current, f is the frequency (in the unit of Hz) of the source current, $\varepsilon$ is the permittivity (in the unit of F/m), and $\sigma$ is the conductivity (in the unit of S/m).

Further, the uniform current is subjected to cosine processing as following: setting the current at the middle point of the linear current source to $I_0$;

$$I(z') = I_0 \cos(kz'), \quad -\frac{l}{2} \le z' \le \frac{l}{2}; \quad (2)$$

where $I_0$ is the peak value of the harmonic current.

Further, the formula (2) is put into the formula (1a) to obtain the integral expression containing the source point position vector:

$$A(r) = \hat{z}\frac{\mu I_0}{4\pi} \int_{-l/2}^{l/2} \cos(kz') \frac{e^{-jk|r-r'|}}{|r-r'|} dz' = \hat{z}\frac{\mu I_0}{4\pi} \int_{-l/2}^{l/2} \cos(kz') \frac{e^{-jkR}}{R} dz'; \quad (3)$$

Further, a process for obtaining the exact solutions includes:
step 4.1, the relation formula between the vector magnetic potential A(r) containing the source point position vector and the magnetic field intensity H(r) is expanded in the cylindrical-coordinate system to obtain the following magnetic field intensity H(r):

$$H(r) = \frac{1}{\mu} \nabla \times A(r) = -\hat{\varphi}\frac{1}{\mu}\frac{\partial A_z(\rho,z)}{\partial \rho} = \hat{\varphi} H_\varphi; \quad (4)$$

in the formula, $\hat{\varphi}$ is the unit vector along the $\varphi$ direction.

step 4.2, the integral formula (3) of the vector magnetic potential A(r) containing the source point position vector is put into the formula (4) of the magnetic field intensity H(r), to obtain:

$$H_\varphi = -\frac{I_0}{4\pi} \frac{\partial}{\partial \rho} \int_{-l/2}^{l/2} \cos(kz') \frac{e^{-jkR}}{R} dz'; \quad (5a)$$

step 4.3, the exact solution is obtained by using Euler formula and homogeneous Maxwell equation: according to the Euler formula:

$$\cos(kz') = \frac{e^{j(kz')} + e^{-j(kz')}}{2} \quad (5b)$$

formula (5b) is put into the formula (5a) for expansion to obtain $$H_\varphi = -\frac{I_0}{8\pi} \int_{-l/2}^{l/2} \left[ \frac{\partial}{\partial \rho} \frac{e^{-jk(R-z')}}{R} + \frac{\partial}{\partial \rho} \frac{e^{-jk(R+z')}}{R} \right] dz' \quad (6)$$

$$= -\frac{I_0}{8\pi} \left\{ \int_{-l/2}^{l/2} \left[ \frac{1}{R} \frac{\partial}{\partial \rho} e^{-jk(R-z')} + e^{-jk(R-z')} \frac{\partial}{\partial \rho} \frac{1}{R} \right] dz' + \int_{-l/2}^{l/2} \left[ \frac{1}{R} \frac{\partial}{\partial \rho} e^{-jk(R+z')} + e^{-jk(R+z')} \frac{\partial}{\partial \rho} \frac{1}{R} \right] dz' \right\}$$

$$= \frac{I_0}{8\pi} \left\{ \rho \int_{-l/2}^{l/2} \left[ -jk \frac{e^{-jk(R-z')}}{R^2} - \frac{e^{-jk(R-z')}}{R^3} \right] dz' + \rho \int_{-l/2}^{l/2} \left[ -jk \frac{e^{-jk(R+z')}}{R^2} - \frac{e^{-jk(R+z')}}{R^3} \right] dz' \right\}$$

$$= -\frac{I_0}{8\pi} \left\{ \rho \int_{-l/2}^{l/2} e^{-jk(R-z')} \left( -jk \frac{1}{R^2} - \frac{1}{R^3} \right) dz' + \rho \int_{-l/2}^{l/2} e^{-jk(R+z')} \left( -jk \frac{1}{R^2} - \frac{1}{R^3} \right) dz' \right\}$$

$$= -\frac{I_0}{8\pi} \left\{ \rho \int_{-l/2}^{l/2} e^{-jk(R-z')} \left[ -jk \frac{1}{R^2} dz' + \frac{z'-z}{R^3(R-z'+z)} dz' - \frac{1}{R^2(R-z'+z)} dz' \right] + \rho \int_{-l/2}^{l/2} e^{-jk(R+z')} \left[ -jk \frac{1}{R^2} dz' - \frac{z'-z}{R^3(R+z'-z)} dz' - \frac{1}{R^2(R+z'-z)} dz' \right] \right\}$$

$$= -\frac{I_0}{8\pi} \left\{ \rho \int_{-l/2}^{l/2} e^{-jk(R-z')} \left[ jk \frac{d(R-z')}{R(R-z'+z)} - \frac{dR^{-1}}{(R-z'+z)} dz' - \frac{d(R-z'+z)^{-1}}{R} \right] + \rho \int_{-l/2}^{l/2} e^{-jk(R+z')} \left[ -jk \frac{d(R+z')}{R(R+z'-z)} + \frac{dR^{-1}}{(R+z'-z)} + \frac{d(R+z'-z)^{-1}}{R} \right] \right\}$$

$$= \frac{I_0}{8\pi} \left\{ \rho \int_{-l/2}^{l/2} d \left[ \frac{e^{-jk(R-z')}}{R(R-z'+z)} \right] - \rho \int_{-l/2}^{l/2} d \left[ \frac{e^{-jk(R+z')}}{R(R+z'-z)} \right] \right\}$$

$$= \frac{I_0 \rho}{8\pi} \left[ \frac{e^{-jk(R-z')}}{R(R-z'+z)} + \frac{e^{-jk(R+z')}}{R(R+z'-z)} \right] \Big|_{-l/2}^{l/2}$$

$$= \frac{I_0\rho}{8\pi}\left[\frac{e^{-jk(R_1-l/2)}}{R_1(R_1-l/2+z)} - \frac{e^{-jk(R_2+l/2)}}{R_2(R_2+l/2-z)} - \frac{e^{-jk(R_1+l/2)}}{R_1(R_1+l/2-z)} + \frac{e^{-jk(R_2-l/2)}}{R_2(R_2-l/2-z)}\right]$$

$$= \frac{I_0\rho}{8\pi}\left\{\frac{e^{-jkR_1}}{R_1}\left[\frac{e^{jkl/2}}{(R_1-l/2+z)} - \frac{e^{-jkl/2}}{(R_1+l/2-z)}\right] + \frac{e^{-jkR_2}}{R_2}\left[\frac{e^{jkl/2}}{(R_2-l/2-z)} - \frac{e^{-jkl/2}}{(R_2+l/2-z)}\right]\right\}$$

$$= \frac{I_0\rho}{8\pi}\left\{\frac{e^{-jkR_1}}{R_1}\left[\frac{\cos(kl/2)+j\sin(kl/2)}{(R_1-l/2+z)} - \frac{\cos(kl/2)-j\sin(kl/2)}{(R_1+l/2-z)}\right] - \frac{e^{-jkR_2}}{R_2}\left[\frac{\cos(kl/2)+j\sin(kl/2)}{(R_2-l/2-z)} - \frac{\cos(kl/2)-j\sin(kl/2)}{(R_2+l/2-z)}\right]\right\}$$

$$= \frac{I_0}{4\pi\rho}\left[\left(\frac{l/2-z}{R_1}e^{-jkR_1} + \frac{l/2+z}{R_2}e^{-jkR_2}\right)\cos\left(\frac{kl}{2}\right) + j(e^{-jkR_1} + e^{-jkR_2})\sin\left(\frac{kl}{2}\right)\right];$$

according to the homogeneous Maxwell equation:

$$E(r) = \frac{1}{j\omega\varepsilon+\sigma}\nabla \times H(r) \quad (7)$$

an electric field expression is obtained:

$$E_\rho = -\frac{1}{j\omega\varepsilon+\sigma}\frac{\partial H_\varphi}{\partial z} \quad (8)$$

$$= \frac{jI_0}{4\pi\rho}\sqrt{\frac{\mu}{\varepsilon-j\frac{\sigma}{\omega}}}\left\{\left[\left(\frac{1}{kR_1^3} + \frac{j}{R_1^2}\right)\left(\frac{l}{2}-z\right)^2 e^{-jkR_1} - \frac{1}{kR_1}e^{-jkR_1} - \left(\frac{1}{kR_2^3} + \frac{j}{R_2^2}\right)\left(\frac{l}{2}+z\right)^2 e^{-jkR_2} + \frac{1}{kR_2}e^{-jkR_2}\right]\cos\left(\frac{kl}{2}\right) - \left[\frac{1}{R_1}\left(\frac{l}{2}-z\right)e^{-jkR_1} - \frac{1}{R_2}\left(\frac{l}{2}+z\right)e^{-jkR_2}\right]\sin\left(\frac{kl}{2}\right)\right\};$$

$$E_z = \frac{1}{j\omega\varepsilon+\sigma}\frac{1}{\rho}\frac{\partial(\rho H_\varphi)}{\partial\rho} = \frac{1}{j\omega\varepsilon+\sigma}\left(\frac{\partial H_\varphi}{\partial\rho} + \frac{1}{\rho}H_\varphi\right) \quad (9)$$

$$= \frac{jI_0}{4\pi}\sqrt{\frac{\mu}{\varepsilon-j\frac{\sigma}{\omega}}}\left\{\left[\left(\frac{j}{R_1^2} + \frac{1}{kR_1^3}\right)\left(\frac{l}{2}-z\right)e^{-jkR_1} + \left(\frac{j}{R_2^2} + \frac{1}{kR_2^3}\right)\left(\frac{l}{2}+z\right)e^{-jkR_2}\right]\cos\left(\frac{kl}{2}\right) - \left[\frac{1}{R_1}e^{-jkR_1} + \frac{1}{R_2}e^{-jkR_2}\right]\sin\left(\frac{kl}{2}\right)\right\};$$

where $$R_1 = \sqrt{\rho^2 + (z-l/2)^2}, \quad (10a)$$

$$R_2 = \sqrt{\rho^2 + (z+l/2)^2}; \quad (10b)$$

The present invention has the following beneficial effects:

Compared with uniform approximate expression, the cosine expression of the linear current source of the present invention can reflect the fundamental attributes of the harmonic current better. In the environment of geophysical electromagnetic exploration, it truly reflects the volatility of current along the line (weak or significant) whatever the ratio between the wavelength λ and the line length l is (an electric dipole that may be considered as the point source in the far zone, or a finite-length linear current source); and compared with the original uniform current expression, the cosine current expression of the present invention has wider applicability for changes of the working frequency and the conductivity of the space medium.

The closed form exact solution for the field generated by a finite-length harmonic linear current source in the whole space obtained through the cosine expression of the finite-length linear current source is applicable in the all zone. The closed form solution composed of elementary function can intuitively reveal the change rule of the electromagnetic field, intuitively exhibit the relation between the field quantity and the parameters, and play a key role in theoretical study on antenna and radio wave propagation.

Furthermore, the cosine expression of the harmonic linear current source of the present invention can better reflect the assumption of the uniform distribution of the electric dipole current in a free space; and the obtained closed form exact solution for the field generated by a finite-length harmonic linear current source in the whole space has the same beneficial effects for underwater communication.

IV. BRIEF DESCRIPTION OF DRAWINGS

V. DETAILED DESCRIPTION OF THE INVENTION

To clarify the purpose, technical solutions and advantages of the present invention, the present invention is further described below in conjunction with the drawings and examples. It should be understood that the examples described herein are only used to explain the present invention, not to limit the present invention.

Figure 5:
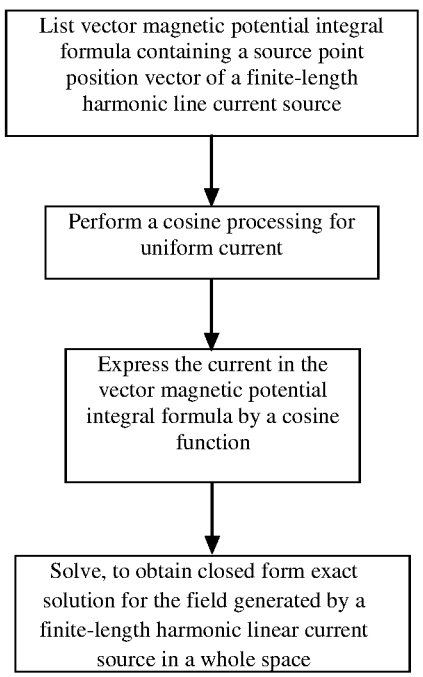
FIG. 5 shows a flow diagram of a method of solving closed form exact solution for the field generated by a finite-length harmonic linear current source in a whole space.

As shown in FIG. 5, a method of solving closed form exact solution for the field generated by a finite-length harmonic linear current source in a whole space includes:

step 1, listing integral formula for vector magnetic potential containing a source point position vector of a finite-length harmonic linear current source;

step 2, performing a cosine processing for the uniform current;

step 3, expressing current in the integral formula for vector magnetic potential containing the source point position vector by a cosine function; and step 4, solving the integral containing the source point position vector to obtain the closed form exact solution for the field generated by the finite-length harmonic linear current source in the whole space.

Figure 1:
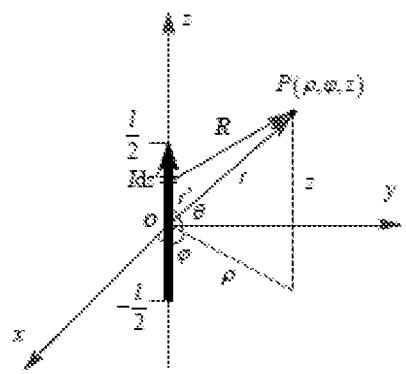
FIG. 1 shows a linear current source and a coordinate system.

Further, taking a cylindrical-coordinate system, a middle point of the linear current source coincides with coordinates origin O and is placed along the z axis; as shown in FIG. 1, in a uniform, linear, isotropic and time-invariant unbounded medium, a vector magnetic potential formula A(r) of the harmonic linear current source containing the source point position vector is listed:

$$A(r) = \hat{z}A_z(\rho, z) = \hat{z}\frac{\mu}{4\pi}\int_{-l/2}^{l/2}\frac{I(z')e^{-jk|r-r'|}}{|r-r'|}dz' = \quad (1a)$$

$$\hat{z}\frac{\mu}{4\pi}\int_{-l/2}^{l/2}\frac{I(z')e^{-jk\sqrt{\rho^2+(z-z')^2}}}{\sqrt{\rho^2+(z-z')^2}}dz' = \hat{z}\frac{\mu}{4\pi}\int_{-l/2}^{l/2}\frac{I(z')e^{-jkR}}{R}dz'$$

where $A_z(\rho,z)$ is the z component of the vector magnetic potential A(r); due to the symmetry, $A_z$ is only the function of $(\rho,z)$ among three coordinate variables $(\rho,\varphi,z)$ of the cylindrical-coordinate system, $\hat{z}$ is the unit vector along the z-axis direction, r is the field point position vector, r' is the source point position vector, z' is the source point position coordinate, $\mu$ is the permeability, l is the length of the linear current source, I(z) is the current distribution function, j is the imaginary unit, R is the distance from the source point to the field point, k is the wave number, and ω is the radial distance in the cylindrical-coordinate system.

$$k=\sqrt{\omega^2\mu\varepsilon-j\omega\mu\sigma}=\sqrt{2\pi f\mu(2\pi f\varepsilon-j\sigma)} \quad (1b)$$

where ω is the angular frequency (in the unit of rad/s) of the source current, f is the frequency (in the unit of Hz) of the source current, ε is the permittivity (in the unit of F/m), and σ is the conductivity (in the unit of S/m).

Further, the uniform current is subjected to cosine processing as following: setting the current at the middle point of the linear current source to $I_0$;

$$I(z') = I_0\cos(kz'), -\frac{l}{2} \le z' \le \frac{l}{2}; \quad (2)$$

where $I_0$ is the peak value of harmonic current.

Further, the formula (2) is put into the formula (1a) to obtain the integral expression containing the source point position vector:

$$A(r) = \hat{z}\frac{\mu I_0}{4\pi}\int_{-l/2}^{l/2}\cos(kz')\frac{e^{-jk|r-r'|}}{|r-r'|}dz' = \hat{z}\frac{\mu I_0}{4\pi}\int_{-l/2}^{l/2}\cos(kz')\frac{e^{-jkR}}{R}dz'; \quad (3)$$

Further, a process for obtaining the exact solution includes:

step 4.1, the relation formula between the vector magnetic potential A(r) containing the source point position vector and the magnetic field intensity H(r) is expanded in the cylindrical-coordinate system to obtain the following magnetic field intensity H(r):

$$H(r) = \frac{1}{\mu}\nabla \times A(r) = -\hat{\varphi}\frac{1}{\mu}\frac{\partial A_z(\rho, z)}{\partial \rho} = \hat{\varphi}H_\varphi; \quad (4)$$

in the formula, $\hat{\varphi}$ is the unit vector along the ω direction.

step 4.2, the integral formula (3) of the vector magnetic potential A(r) containing the source point position vector is put into the formula (4) of the magnetic field intensity H(r), to obtain:

$$H_\varphi = -\frac{I_0}{4\pi}\frac{\partial}{\partial \rho}\int_{-l/2}^{l/2}\cos(kz')\frac{e^{-jkR}}{R}dz'; \quad (5a)$$

step 4.3, the exact solution is obtained by using Euler formula and homogeneous Maxwell equation: according to the Euler formula:

$$\cos(kz') = \frac{e^{j(kz')} + e^{-j(kz')}}{2} \quad (5b)$$

formula (5b) is put into the formula (5a) for expansion to obtain $$H_\varphi = -\frac{I_0}{8\pi}\int_{-l/2}^{l/2}\left[\frac{\partial}{\partial \rho}\frac{e^{-jk(R-z')}}{R} + \frac{\partial}{\partial \rho}\frac{e^{-jk(R+z')}}{R}\right]dz' \quad (6)$$

$$= -\frac{I_0}{8\pi}\left\{\int_{-l/2}^{l/2}\left[\frac{1}{R}\frac{\partial}{\partial \rho}e^{-jk(R-z')} + e^{-jk(R-z')}\frac{\partial}{\partial \rho}\frac{1}{R}\right]dz' + \right.$$

$$\int_{-l/2}^{l/2}\left[\frac{1}{R}\frac{\partial}{\partial \rho}e^{-jk(R+z')} + e^{-jk(R+z')}\frac{\partial}{\partial \rho}\frac{1}{R}\right]dz'\right\}$$

$$= -\frac{I_0}{8\pi}\left\{\rho\int_{-l/2}^{l/2}\left[-jk\frac{e^{-jk(R-z')}}{R^2} - \frac{e^{-jk(R-z')}}{R^3}\right]dz' + \rho\int_{-l/2}^{l/2}\left[-jk\frac{e^{-jk(R+z')}}{R^2} - \right.\right.$$

$$\left.\left.\frac{e^{-jk(R+z')}}{R^3}\right]dz'\right\}$$

-continued $$= -\frac{I_0}{8\pi}\left\{\rho\int_{-l/2}^{l/2} e^{-jk(R-z')}\left(-jk\frac{1}{R^2}-\frac{1}{R^3}\right)dz' + \rho\int_{-l/2}^{l/2} e^{-jk(R+z')}\left(-jk\frac{1}{R^2}-\frac{1}{R^3}\right)dz'\right\}$$

$$= -\frac{I_0}{8\pi}\left\{\rho\int_{-l/2}^{l/2} e^{-jk(R-z')}\left[-jk\frac{1}{R^2}dz' + \frac{z'-z}{R^3(R-z'+z)}dz' - \frac{1}{R^2(R-z'+z)}dz'\right] + \rho\int_{-l/2}^{l/2} e^{-jk(R+z')}\left[-jk\frac{1}{R^2}dz' - \frac{z'-z}{R^3(R+z'-z)}dz' - \frac{1}{R^2(R+z'-z)}dz'\right]\right\}$$

$$= -\frac{I_0}{8\pi}\left\{\rho\int_{-l/2}^{l/2} e^{-jk(R-z')}\left[jk\frac{d(R-z')}{R(R-z'+z)} - \frac{dR^{-1}}{(R-z'+z)}dz' - \frac{d(R-z'+z)^{-1}}{R}\right] + \rho\int_{-l/2}^{l/2} e^{-jk(R+z')}\left[-jk\frac{d(R+z')}{R(R+z'-z)} + \frac{dR^{-1}}{(R+z'-z)} + \frac{d(R+z'-z)^{-1}}{R}\right]\right\}$$

$$= \frac{I_0}{8\pi}\left\{\rho\int_{-l/2}^{l/2} d\left[\frac{e^{-jk(R-z')}}{R(R-z'+z)}\right] - \rho\int_{-l/2}^{l/2} d\left[\frac{e^{-jk(R+z')}}{R(R+z'-z)}\right]\right\}$$

$$= \frac{I_0\rho}{8\pi}\left[\frac{e^{-jk(R-z')}}{R(R-z'+z)} + \frac{e^{-jk(R+z')}}{R(R+z'-z)}\right]_{-l/2}^{l/2}$$

$$= \frac{I_0\rho}{8\pi}\left[\frac{e^{-jk(R_1-l/2)}}{R_1(R_1-l/2+z)} - \frac{e^{-jk(R_2+l/2)}}{R_2(R_2+l/2-z)} - \frac{e^{-jk(R_1+l/2)}}{R_1(R_1+l/2-z)} + \frac{e^{-jk(R_2-l/2)}}{R_2(R_2-l/2-z)}\right]$$

$$= \frac{I_0\rho}{8\pi}\left\{\frac{e^{-jkR_1}}{R_1}\left[\frac{e^{jkl/2}}{(R_1-l/2+z)} - \frac{e^{-jkl/2}}{(R_1+l/2-z)}\right] + \frac{e^{-jkR_2}}{R_2}\left[\frac{e^{jkl/2}}{(R_2-l/2-z)} - \frac{e^{-jkl/2}}{(R_2+l/2-z)}\right]\right\}$$

$$= \frac{I_0\rho}{8\pi}\left\{\frac{e^{-jkR_1}}{R_1}\left[\frac{\cos(kl/2)+j\sin(kl/2)}{(R_1+l/2+z)} - \frac{\cos(kl/2)-j\sin(kl/2)}{(R_1+l/2-z)}\right] - \frac{e^{-jkR_2}}{R_2}\left[\frac{\cos(kl/2)+j\sin(kl/2)}{(R_2-l/2-z)} - \frac{\cos(kl/2)-j\sin(kl/2)}{(R_2+l/2-z)}\right]\right\}$$

$$= \frac{I_0}{4\pi\rho}\left[\left(\frac{l/2-z}{R_1}e^{-jkR_1} + \frac{l/2+z}{R_2}e^{-jkR_2}\right)\cos\left(\frac{kl}{2}\right) + j(e^{-jkR_1}+e^{-jkR_2})\sin\left(\frac{kl}{2}\right)\right];$$

according to the homogeneous Maxwell equation:

$$E(r) = \frac{1}{j\omega\varepsilon+\sigma}\nabla\times H(r) \quad (7)$$

an electric field expression is obtained:

$$E_\rho = -\frac{1}{j\omega\varepsilon+\sigma}\frac{\partial H_\varphi}{\partial z} \quad (8)$$

$$= \frac{jI_0}{4\pi\rho}\sqrt{\frac{\mu}{\varepsilon-j\frac{\sigma}{\omega}}}\left\{\left[\left(\frac{1}{kR_1^3}+\frac{j}{R_1^2}\right)\left(\frac{l}{2}-z\right)^2 e^{-jkR_1} - \frac{1}{kR_1}e^{-jkR_1} - \left(\frac{1}{kR_2^3}+\frac{j}{R_2^2}\right)\left(\frac{l}{2}+z\right)^2 e^{-jkR_2} + \frac{1}{kR_2}e^{-jkR_2}\right]\cos\left(\frac{kl}{2}\right) - \left[\frac{1}{R_1}\left(\frac{l}{2}-z\right)e^{-jkR_1} - \frac{1}{R_2}\left(\frac{l}{2}+z\right)e^{-jkR_2}\right]\sin\left(\frac{kl}{2}\right)\right\};$$

$$E_z = \frac{1}{j\omega\varepsilon+\sigma}\frac{1}{\rho}\frac{\partial(\rho H_\varphi)}{\partial\rho} = \frac{1}{j\omega\varepsilon+\sigma}\left(\frac{\partial H_\varphi}{\partial\rho}+\frac{1}{\rho}H_\varphi\right) \quad (9)$$

$$= \frac{jI_0}{4\pi}\sqrt{\frac{\mu}{\varepsilon-j\frac{\sigma}{\omega}}}\left\{\left[\left(\frac{j}{R_1^2}+\frac{1}{kR_1^3}\right)\left(\frac{l}{2}-z\right)e^{-jkR_1} + \left(\frac{j}{R_2^2}+\frac{1}{kR_2^3}\right)\left(\frac{l}{2}+z\right)e^{-jkR_2}\right]\cos\left(\frac{kl}{2}\right) - \left[\frac{1}{R_1}e^{-jkR_1}+\frac{1}{R_2}e^{-jkR_2}\right]\sin\left(\frac{kl}{2}\right)\right\};$$

where $$R_1 = \sqrt{\rho^2+(z-l/2)^2}, \quad (10a)$$

$$R_2 = \sqrt{\rho^2+(z+l/2)^2}; \quad (10b)$$

Example 1, in the free space $I_0=1$ A, $l=2$ m, $f=10^6$ Hz, $\mu=\mu_0=4\pi\times10^{-7}$ H/m, $$\varepsilon = \varepsilon_0 \approx \frac{10^{-9}}{36\pi}$$

Figure 2:
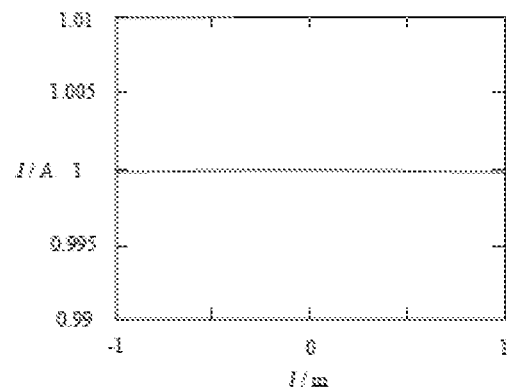
FIG. 2 shows the current distribution of a finite-length harmonic linear current source in a free space.

F/m and $\sigma=0$ S/m are put into the formula (2) to obtain current distribution of a finite-length harmonic linear current source in a free space, as shown in FIG. 2;

according to the formula (6), formula (8) and formula (9) of the exact solution, in the free space, the field generated by the harmonic linear current source is (wherein $l=2$ m, $I_0=1$ A and $f=10^6$ Hz):

$$H_\varphi = \frac{I_0}{4\pi\rho}\left[\left(\frac{l/2-z}{R_1}e^{-jkR_1} + \frac{l/2+z}{R_2}e^{-jkR_2}\right)\cos\left(\frac{kl}{2}\right) + j(e^{-jkR_1}+e^{-jkR_2})\sin\left(\frac{kl}{2}\right)\right] \quad (11)$$

$$= \frac{1}{4\pi\rho}\left[\left(\frac{1-z}{R_1}e^{-jkR_1} + \frac{1+z}{R_2}e^{-jkR_2}\right)\cos(k) + j(e^{-jkR_1}+e^{-jkR_2})\sin(k)\right]$$

$$E_\rho = \frac{jI_0}{4\pi\rho}\sqrt{\frac{\mu}{\varepsilon-j\frac{\sigma}{\omega}}}\left\{\left[\left(\frac{1}{kR_1^3}+\frac{j}{R_1^2}\right)\left(\frac{l}{2}-z\right)^2 e^{-jkR_1} - \frac{1}{kR_1}e^{-jkR_1} - \left(\frac{1}{kR_2^3}+\frac{j}{R_2^2}\right)\left(\frac{l}{2}+z\right)^2 e^{-jkR_2} + \frac{1}{kR_2}e^{-jkR_2}\right]\cos\left(\frac{kl}{2}\right) - \left[\frac{1}{R_1}\left(\frac{l}{2}-z\right)e^{-jkR_1} - \frac{1}{R_2}\left(\frac{l}{2}+z\right)e^{-jkR_2}\right]\sin\left(\frac{kl}{2}\right)\right\} \quad (12)$$

$$\approx \frac{j30}{\rho}\left\{\left[\left(\frac{1}{kR_1^3}+\frac{j}{R_1^2}\right)(1-z)^2 e^{-jkR_1} - \frac{1}{kR_1}e^{-jkR_1} - \left(\frac{1}{kR_2^3}+\frac{j}{R_2^2}\right)(1+z)^2 e^{-jkR_2} + \frac{1}{kR_2}e^{-jkR_2}\right]\cos(k) - \left[\frac{1}{R_1}(1-z)e^{-jkR_1} - \frac{1}{R_2}(1+z)e^{-jkR_2}\right]\sin(k)\right\}$$

$$E_z = \frac{jI_0}{4\pi}\sqrt{\frac{\mu}{\varepsilon - j\frac{\sigma}{\omega}}}\left\{\left[\left(\frac{j}{R_1^2} + \frac{1}{kR_1^3}\right)\left(\frac{l}{2} - z\right)e^{-jkR_1} + \left(\frac{j}{R_2^2} + \frac{1}{kR_2^3}\right)\left(\frac{l}{2} + z\right)e^{-jkR_2}\right]\cos\left(\frac{kl}{2}\right) - \left[\frac{1}{R_1}e^{-jkR_1} + \frac{1}{R_2}e^{-jkR_2}\right]\sin\left(\frac{kl}{2}\right)\right\} \quad (13)$$

$$\approx j30\left\{\left[\left(\frac{j}{R_1^2} + \frac{1}{kR_1^3}\right)(1-z)e^{-jkR_1} + \left(\frac{j}{R_2^2} + \frac{1}{kR_2^3}\right)(1+z)e^{-jkR_2}\right]\cos(k) - \left[\frac{1}{R_1}e^{-jkR_1} + \frac{1}{R_2}e^{-jkR_2}\right]\sin(k)\right\}$$

According to the formula (10), it can be known that in the above formula (11), formula (12) and formula (13):

$$R_1 = \sqrt{\rho^2 + (z-l/2)^2} = \sqrt{\rho^2 + (z-1)^2}$$

$$R_2 = \sqrt{\rho^2 + (z+l/2)^2} = \sqrt{\rho^2 + (z+1)^2}$$

According to the formula (1b), it can be known that the wave number k in the above formula (11), formula (12) and formula (13) are:

$$k = \sqrt{2\pi f\mu(2\pi f\varepsilon - j\sigma)} \approx \sqrt{2\pi \times 10^6 \times 4\pi \times 10^{-7}\left(2\pi \times 10^6 \times \frac{10^{-9}}{36\pi} - j0\right)} = \sqrt{8\pi^2 \times 10^{-1}\left(\frac{10^{-3}}{18}\right)} = \frac{2\pi}{3} \times 10^{-2}$$

The field point coordinate $P(\rho,\varphi,z)$ is put into the formula (11), formula (12) and formula (13) to obtain the spatial distribution of the field generated by the finite-length harmonic linear current source in the free space, wherein $l=2$ m, $I_0=1$ A and $f=10^6$ Hz.

Figure 3:
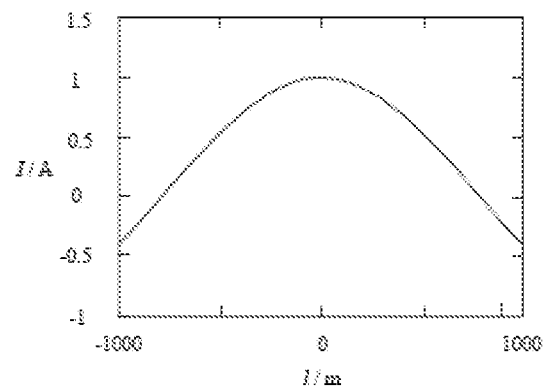
FIG. 3 shows the current distribution of a finite-length harmonic linear current source in the wet soil environment.

Example 2, in the wet soil environment
$I_0=1$ A, $l=2000$ m, $f=100$ Hz, $\mu=\mu_0=4\pi\times 10^{-7}$ H/m, $$\varepsilon = 10 \times \varepsilon_0 \approx 10\frac{10^{-9}}{36\pi} F/m$$

and $\sigma=0.01$ S/m are put into the formula (2) to obtain current distribution of a finite-length harmonic linear current source in the wet soil environment, as shown in FIG. 3; according to the formula (6), formula (8) and formula (9) of the exact solution, in the wet soil environment, the field generated by the harmonic line current source is (wherein $l=2000$ m, $I_0=1$ A and $f=100$ Hz):

$$H_\varphi = \frac{I_0}{4\pi\rho}\left[\left(\frac{l/2-z}{R_1}e^{-jkR_1} + \frac{l/2+z}{R_2}e^{-jkR_2}\right)\cos\left(\frac{kl}{2}\right) + j(e^{-jkR_1} + e^{-jkR_2})\sin\left(\frac{kl}{2}\right)\right] \quad (14)$$

$$= \frac{1}{4\pi\rho}\left[\left(\frac{1000-z}{R_1}e^{-jkR_1} + \frac{1000+z}{R_2}e^{-jkR_2}\right)\cos(1000k) + j(e^{-jkR_1} + e^{-jkR_2})\sin(1000k)\right]$$

$$E_\rho = \frac{jI_0}{4\pi\rho}\sqrt{\frac{\mu}{\varepsilon - j\frac{\sigma}{\omega}}}\left\{\left[\left(\frac{1}{kR_1^3} + \frac{j}{R_1^2}\right)\left(\frac{l}{2}-z\right)^2 e^{-jkR_1} - \frac{1}{kR_1}e^{-jkR_1} - \left(\frac{1}{kR_2^3} + \frac{j}{R_2^2}\right)\left(\frac{l}{2}+z\right)^2 e^{-jkR_2} + \frac{1}{kR_2}e^{-jkR_2}\right]\cos\left(\frac{kl}{2}\right) - \left[\frac{1}{R_1}\left(\frac{l}{2}-z\right)e^{-jkR_1} - \frac{1}{R_2}\left(\frac{l}{2}+z\right)e^{-jkR_2}\right]\sin\left(\frac{kl}{2}\right)\right\}$$

$$\approx \frac{0.05}{\rho\sqrt{5}}\left\{\left[\left(\frac{1}{kR_1^3} + \frac{j}{R_1^2}\right)(1000-z)^2 e^{-jkR_1} - \frac{1}{kR_1}e^{-jkR_1} - \left(\frac{1}{kR_2^3} + \frac{j}{R_2^2}\right)(1000+z)^2 e^{-jkR_2} + \frac{1}{kR_2}e^{-jkR_2}\right]\cos(1000k) - \left[\frac{1}{R_1}(1000-z)e^{-jkR_1} - \frac{1}{R_2}(1000+z)e^{-jkR_2}\right]\sin(1000k)\right\} \quad (15)$$

$$E_z = \frac{jI_0}{4\pi}\sqrt{\frac{\mu}{\varepsilon - j\frac{\sigma}{\omega}}}\left\{\left[\left(\frac{j}{R_1^2} + \frac{1}{kR_1^3}\right)\left(\frac{l}{2}-z\right)e^{-jkR_1} + \left(\frac{j}{R_2^2} + \frac{1}{kR_2^3}\right)\left(\frac{l}{2}+z\right)e^{-jkR_2}\right]\cos\left(\frac{kl}{2}\right) - \left[\frac{1}{R_1}e^{-jkR_1} + \frac{1}{R_2}e^{-jkR_2}\right]\sin\left(\frac{kl}{2}\right)\right\}$$

$$\approx \frac{0.05}{\sqrt{5}}\left\{\left[\left(\frac{j}{R_1^2} + \frac{1}{kR_1^3}\right)(1000-z)e^{-jkR_1} + \left(\frac{j}{R_2^2} + \frac{1}{kR_2^3}\right)(1000+z)e^{-jkR_2}\right]\cos(1000k) - \left[\frac{1}{R_1}e^{-jkR_1} + \frac{1}{R_2}e^{-jkR_2}\right]\sin(1000k)\right\} \quad (16)$$

According to the formula (10), it can be known that in the above formula (14), formula (15) and formula (16):

$$R_1 = \sqrt{\rho^2 + (z-l/2)^2} = \sqrt{\rho^2 + (z-1000)^2}$$

$$R_2 = \sqrt{\rho^2 + (z+l/2)^2} = \sqrt{\rho^2 + (z+1000)^2}$$

According to the formula (1b), it can be known that the wave number k in the above formula (14), formula (15) and formula (16) are:

$$k = \sqrt{2\pi f\mu(2\pi f\varepsilon - j\sigma)} \approx \sqrt{2\pi \times 100 \times 4\pi \times 10^{-7}\left(2\pi \times 100 \times 10\frac{10^{-9}}{36\pi} - j0.01\right)} = \sqrt{8\pi^2 \times 10^{-5}\left(10\frac{10^{-7}}{18} - j10^{-2}\right)} = \frac{2\pi}{3}\times 10^{-6}\sqrt{10 - j18\times 10^5} \approx j4\pi \times 10^{-4}\sqrt{5}$$

The field point coordinate $P(\rho,\varphi,z)$ is put into the formula (14), formula (15) and formula (16) to obtain the spatial distribution of the field generated by the finite-length harmonic linear current source the wet soil environment, wherein $l=2000$ m, $I_0=1$ A and $f=100$ Hz.

Figure 4:
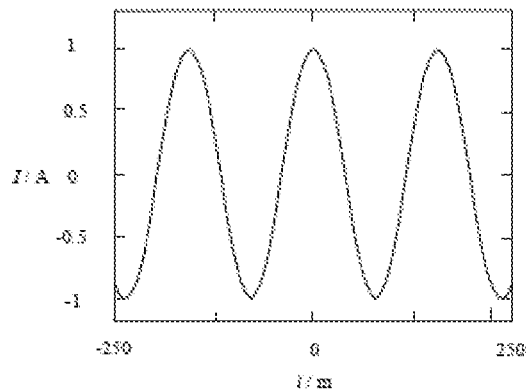
FIG. 4 shows the current distribution of a finite-length harmonic linear current source in the seawater environment.

Example 3, in the seawater environment
$I_0=1$ A, $l=500$ m, $f=100$ Hz, $\mu=\mu_0=4\pi\times 10^{-7}$ H/m, $$\varepsilon = 80 \times \varepsilon_0 \approx 80\frac{10^{-9}}{36\pi} F/m$$

and $\sigma=4$ S/m are put into the formula (2) to obtain current distribution of a finite-length harmonic linear current source in the seawater environment, as shown in FIG. 4.

according to the formula (6), formula (8) and formula (9), in the seawater environment, the field generated by the harmonic line current source is ($l=500$ m, $I_0=1$ A and $f=100$ Hz):

$$H_\varphi = \frac{I_0}{4\pi\rho}\left[\left(\frac{l/2-z}{R_1}e^{-jkR_1} + \frac{l/2+z}{R_2}e^{-jkR_2}\right)\cos\left(\frac{kl}{2}\right) + \right. \quad (17)$$
$$\left. j(e^{-jkR_1} + e^{-jkR_2})\sin\left(\frac{kl}{2}\right)\right]$$
$$= \frac{1}{4\pi\rho}\left[\left(\frac{250-z}{R_1}e^{-jkR_1} + \frac{250+z}{R_2}e^{-jkR_2}\right)\cos(250k) + j(e^{-jkR_1} + e^{-jkR_2})\sin(250k)\right]$$

$$E_\rho = \frac{jI_0}{4\pi\rho}\sqrt{\frac{\mu}{\varepsilon - j\frac{\sigma}{\omega}}}\left\{\left[\left(\frac{1}{kR_1^3} + \frac{j}{R_1^2}\right)\left(\frac{l}{2}-z\right)^2 e^{-jkR_1} - \frac{1}{kR_1}e^{-jkR_1} - \right.\right.$$
$$\left(\frac{1}{kR_2^3} + \frac{j}{R_2^2}\right)\left(\frac{l}{2}+z\right)^2 e^{-jkR_2} + \frac{1}{kR_2}e^{-jkR_2}\right]\cos\left(\frac{kl}{2}\right) -$$
$$\left[\frac{1}{R_1}\left(\frac{l}{2}-z\right)e^{-jkR_1} - \frac{1}{R_2}\left(\frac{l}{2}+z\right)e^{-jkR_2}\right]\sin\left(\frac{kl}{2}\right)\right\}$$

$$\approx \frac{0.0025}{\rho\sqrt{5}}\left\{\left[\left(\frac{1}{kR_1^3} + \frac{j}{R_1^2}\right)(250-z)^2 e^{-jkR_1} - \frac{1}{kR_1}e^{-jkR_1} - \right.\right. \quad (18)$$
$$\left(\frac{1}{kR_2^3} + \frac{j}{R_2^2}\right)(250+z)^2 e^{-jkR_2} + \frac{1}{kR_2}e^{-jkR_2}\right]\cos(250k) -$$
$$\left[\frac{1}{R_1}(250-z)e^{-jkR_1} - \frac{1}{R_2}(250+z)e^{-jkR_2}\right]\sin(250k)\right\}$$

$$E_z = \frac{jI_0}{4\pi}\sqrt{\frac{\mu}{\varepsilon - j\frac{\sigma}{\omega}}}\left\{\left[\left(\frac{j}{R_1^2} + \frac{1}{kR_1^3}\right)\left(\frac{l}{2}-z\right)e^{-jkR_1} + \right.\right.$$
$$\left(\frac{j}{R_2^2} + \frac{1}{kR_2^3}\right)\left(\frac{l}{2}+z\right)e^{-jkR_2}\right]\cos\left(\frac{kl}{2}\right) -$$
$$\left[\frac{1}{R_1}e^{-jkR_1} + \frac{1}{R_2}e^{-jkR_2}\right]\sin\left(\frac{kl}{2}\right)\right\}$$

$$\approx \frac{0.0025}{\rho\sqrt{5}}\left\{\left[\left(\frac{j}{R_1^2} + \frac{1}{kR_1^3}\right)(250-z)e^{-jkR_1} + \right.\right. \quad (19)$$
$$\left(\frac{j}{R_2^2} + \frac{1}{kR_2^3}\right)(250+z)e^{-jkR_2}\right]\cos(250k) - \left[\frac{1}{R_1}e^{-jkR_1} + \right.$$
$$\left.\frac{1}{R_2}e^{-jkR_2}\right]\sin(250k)\right\}$$

According to the formula (10), it can be known that in the above formula (17), formula (18) and formula (19):

$$R_1 = \sqrt{\rho^2 + (z-l/2)^2} = \sqrt{\rho^2(z-250)^2}$$
$$R_2 = \sqrt{\rho^2 + (z+l/2)^2} = \sqrt{\rho^2(z+250)^2}$$

According to the formula (1b), it can be known that the wave number k in the above formula (17), formula (18) and formula (19) are:

$$k = \sqrt{2\pi f\mu(2\pi f\varepsilon - j\sigma)} \approx$$
$$\sqrt{2\pi \times 100 \times 4\pi \times 10^{-7}\left(2\pi \times 100 \times 80\frac{10^{-9}}{36\pi} - j4\right)} =$$
$$\sqrt{8\pi^2 \times 10^{-5}\left(80\frac{10^{-7}}{18} - j4\right)} =$$
$$\frac{2\pi}{3} \times 10^{-6}\sqrt{80 - j72 \times 10^7} \approx j8\pi \times 10^{-3}\sqrt{5}$$

The field point coordinate $P(\rho,\varphi,z)$ is put into the formula (17), formula (18) and formula (19) to obtain the spatial distribution of the field generated by the finite-length harmonic linear current source in the seawater environment (wherein l=500 m, $I_0$=1 A and f=100 Hz).

In conclusion, the exact solution for the field generated by a finite-length harmonic linear current source in the whole space is obtained with the method of solving the closed form exact solution for the field generated by a finite-length harmonic linear current source in the whole space provided in the present invention; the closed form exact solution is not only applicable in the far zone, the middle zone and the near zone, but also can better reflect the situation of distribution along the linear source of the harmonic current; and compared with the original uniform current expression, the cosine current expression of the present invention has better adaptability for changes of the working frequency and the conductivity of the medium.

The above examples are only used for illustrating the design idea and characteristics of the present invention and the purpose thereof is to enable the person skilled in the art to understand the contents of the present invention and make implementation; and the protection scope of the present invention is not limited to the above examples. Therefore, the equivalent changes or modifications made on the basis of principles and design idea disclosed in the present invention are within the protection scope of the present invention.

The invention claimed is:

1. A method of solving a closed form exact solution for a field generated by a finite-length harmonic linear current source in a whole space of a medium, the method comprising:

step 1, listing an integral formula for vector magnetic potential containing a source point position vector of the finite-length harmonic linear current source;

step 2, performing a cosine processing for uniform current;

step 3, expressing current in the integral formula for vector magnetic potential containing the source point position vector by a cosine function, wherein the current in integral for the vector magnetic potential of the harmonic linear current source containing the source point position vector is expressed by cosine function as following:

$$A(r) = \hat{z}\frac{\mu I_0}{4\pi}\int_{-l/2}^{l/2}\cos(kz')\frac{e^{-jk|r-r'|}}{|r-r'|}dz' = \hat{z}\frac{\mu I_0}{4\pi}\int_{-l/2}^{l/2}\cos(kz')\frac{e^{-jkR}}{R}dz',$$

wherein $\hat{z}$ is a unit vector along a z-axis direction, r is a field point position vector, r' is a source point position vector, z' is a source point position coordinate, μ is permeability, l is a length of the linear current source, j is an imaginary unit, R is a distance from the source point to the field point, and k is a wave number; and step 4, solving the integral containing the source point position vector to obtain the closed form exact solution for the field generated by the finite-length harmonic linear current source in the whole space, wherein the closed form exact solution is adapted to changes of a working frequency and a conductivity of the medium.

2. The method of solving closed form exact solution for the field generated by a finite-length harmonic linear current source in whole space according to claim 1, wherein, taking a cylindrical-coordinate system, a middle point of the linear current source coincides with coordinates origin O and is placed along the z-axis; in a uniform, linear, isotropic and time-invariant unbounded medium, a vector magnetic potential formula A(r) of the harmonic linear current source containing the source point position vector is listed:

$$A(r) = \hat{z}A_z(\rho, z) = \hat{z}\frac{\mu}{4\pi}\int_{-l/2}^{l/2}\frac{I(z')e^{-jk|r-r'|}}{|r-r'|}dz' =$$

$$\hat{z}\frac{\mu}{4\pi}\int_{-l/2}^{l/2}\frac{I(z')e^{-jk\sqrt{\rho^2+(z-z')^2}}}{\sqrt{\rho^2+(z-z')^2}}dz' = \hat{z}\frac{\mu}{4\pi}\int_{-l/2}^{l/2}\frac{I(z')e^{-jkR}}{R}dz'$$

wherein $A_z(\rho,z)$ is a z component of the vector magnetic potential $A(r)$; due to symmetry, $A_z$ is only the function of $(\rho,z)$ among three coordinate variables $(\rho,\varphi,z)$ of the cylindrical-coordinate system, $l(z')$ is a current distribution function, and $\rho$ is a radial distance in the cylindrical-coordinate system.

3. The method of solving closed form exact solution for the field generated by a finite-length harmonic linear current source in whole space according to claim 2, wherein the wave number is:

$$k=\sqrt{\omega^2\mu\varepsilon - j\omega\mu\sigma} = \sqrt{2\pi f\mu(2\pi f\varepsilon - j\sigma)}$$

wherein $\omega$ is an angular frequency of the source current, f is a frequency of the source current, $\varepsilon$ is a permittivity, and $\sigma$ is the conductivity.

4. The method of solving closed form exact solution for the field generated by a finite-length harmonic linear current source in a whole space according to claim 1, wherein, the current at a middle point of the linear current source is set to $I_0$, and the uniform current is subjected to a cosine processing to obtain:

$$I(z') = I_0\cos(kz'), -\frac{l}{2} \le z' \le \frac{l}{2};$$

wherein $l(z')$ is a current distribution function, $I_0$ is a peak value of the harmonic current, k is a wave number, and $z'$ is a source point position coordinate.

5. The method of solving closed form exact solution for the field generated by a finite-length harmonic linear current source in whole space according to claim 2, wherein the current in integral for the vector magnetic potential of the harmonic linear current source containing the source point position vector is expressed by cosine function as following:

$$A(r) = \hat{z}\frac{\mu I_0}{4\pi}\int_{-l/2}^{l/2}\cos(kz')\frac{e^{-jk|r-r'|}}{|r-r'|}dz' = \hat{z}\frac{\mu I_0}{4\pi}\int_{-l/2}^{l/2}\cos(kz')\frac{e^{-jkR}}{R}dz'.$$

6. The method of solving closed form exact solution for the field generated by a finite-length harmonic linear current source in whole space according to claim 1, wherein the step of solving the exact solution of the integral containing the source point position vector comprises the following steps:

step 4.1, a relation formula between the vector magnetic potential $A(r)$ containing the source point position vector and a magnetic field intensity $H(r)$ is expanded in a cylindrical-coordinate system to obtain the magnetic field intensity $H(r)$ as follows:

$$H(r) = \frac{1}{\mu}\nabla \times A(r) = -\hat{\varphi}\frac{1}{\mu}\frac{\partial A_z(\rho,z)}{\partial \rho} = \hat{\varphi}H_\varphi;$$

in the formula, $\hat{\varphi}$ is a unit vector along a $\varphi$ direction;

step 4.2, the vector magnetic potential $A(r)$ containing the source point position vector is put into the magnetic field intensity $H(r)$ to obtain:

$$H_\varphi = -\frac{I_0}{4\pi}\frac{\partial}{\partial \rho}\int_{-l/2}^{l/2}\cos(kz')\frac{e^{-jkR}}{R}dz';$$

step 4.3, the exact solution is obtained by using Euler formula and homogeneous Maxwell equation:

$$H_\varphi = \frac{I_0}{4\pi\rho}\left[\left(\frac{l/2-z}{R_1}e^{-jkR_1} + \frac{l/2+z}{R_2}e^{-jkR_2}\right)\cos\left(\frac{kl}{2}\right) + j(e^{-jkR_1} + e^{-jkR_2})\sin\left(\frac{kl}{2}\right)\right];$$

$$E_\rho = \frac{jI_0}{4\pi\rho}\sqrt{\frac{\mu}{\varepsilon - j\frac{\sigma}{\omega}}}\left\{\left[\left(\frac{1}{kR_1^3} + \frac{j}{R_1^2}\right)\left(\frac{l}{2} - z\right)^2 e^{-jkR_1} - \frac{1}{kR_1}e^{-jkR_1} - \left(\frac{1}{kR_2^3} + \frac{j}{R_2^2}\right)\left(\frac{l}{2} + z\right)^2 e^{-jkR_2} + \frac{1}{kR_2}e^{-jkR_2}\right]\cos\left(\frac{kl}{2}\right) - \left[\frac{1}{R_1}\left(\frac{l}{2} - z\right)e^{-jkR_1} - \frac{1}{R_2}\left(\frac{l}{2} + z\right)e^{-jkR_2}\right]\sin\left(\frac{kl}{2}\right)\right\};$$

$$E_z = \frac{jI_0}{4\pi}\sqrt{\frac{\mu}{\varepsilon - j\frac{\sigma}{\omega}}}\left\{\left[\left(\frac{j}{R_1^2} + \frac{1}{kR_1^3}\right)\left(\frac{l}{2} - z\right)e^{-jkR_1} + \left(\frac{j}{R_2^2} + \frac{1}{kR_2^3}\right)\left(\frac{l}{2} + z\right)e^{-jkR_2}\right]\cos\left(\frac{kl}{2}\right) - \left[\frac{1}{R_1}e^{-jkR_1} + \frac{1}{R_2}e^{-jkR_2}\right]\sin\left(\frac{kl}{2}\right)\right\};$$

wherein $R_1 = \sqrt{\rho^2 + (z-l/2)^2}$ and $R_2 = \sqrt{\rho^2 + (z+l/2)^2}$.

7. The method of solving closed form exact solution for the field generated by a finite-length harmonic linear current source in whole space according to claim 2, wherein the step of solving the exact solution of the integral containing the source point position vector comprises the following steps:

step 4.1, a relation formula between the vector magnetic potential $A(r)$ containing the source point position vector and a magnetic field intensity $H(r)$ is expanded in the cylindrical-coordinate system to obtain the magnetic field intensity $H(r)$ as follows:

$$H(r) = \frac{1}{\mu}\nabla \times A(r) = -\hat{\varphi}\frac{1}{\mu}\frac{\partial A_z(\rho,z)}{\partial \rho} = \hat{\varphi}H_\varphi;$$

in the formula, $\hat{\varphi}$ is a unit vector along a $\varphi$ direction;

step 4.2, the vector magnetic potential $A(r)$ containing the source point position vector is put into the magnetic field intensity $H(r)$ to obtain:

$$H_\varphi = -\frac{I_0}{4\pi}\frac{\partial}{\partial \rho}\int_{-l/2}^{l/2}\cos(kz')\frac{e^{-jkR}}{R}dz';$$

step 4.3, the exact solution is obtained by using Euler formula and homogeneous Maxwell equation:

$$H_\varphi = \frac{I_0}{4\pi\rho}\left[\left(\frac{l/2-z}{R_1}e^{-jkR_1} + \frac{l/2+z}{R_2}e^{-jkR_2}\right)\cos\left(\frac{kl}{2}\right) + j(e^{-jkR_1} + e^{-jkR_2})\sin\left(\frac{kl}{2}\right)\right];$$

$$E_\rho = \frac{jI_0}{4\pi\rho}\sqrt{\frac{\mu}{\varepsilon - j\frac{\sigma}{\omega}}}\left\{\left[\left(\frac{1}{kR_1^3} + \frac{j}{R_1^2}\right)\left(\frac{l}{2}-z\right)^2 e^{-jkR_1} - \frac{1}{kR_1}e^{-jkR_1} - \left(\frac{1}{kR_2^3} + \frac{j}{R_2^2}\right)\left(\frac{l}{2}+z\right)^2 e^{-jkR_2} + \frac{1}{kR_2}e^{-jkR_2}\right]\cos\left(\frac{kl}{2}\right) - \left[\frac{1}{R_1}\left(\frac{l}{2}-z\right)e^{-jkR_1} - \frac{1}{R_2}\left(\frac{l}{2}+z\right)e^{-jkR_2}\right]\sin\left(\frac{kl}{2}\right)\right\};$$

$$E_z = \frac{jI_0}{4\pi}\sqrt{\frac{\mu}{\varepsilon - j\frac{\sigma}{\omega}}}\left\{\left[\left(\frac{j}{R_1^2} + \frac{1}{kR_1^3}\right)\left(\frac{l}{2}-z\right)e^{-jkR_1} + \left(\frac{j}{R_2^2} + \frac{1}{kR_2^3}\right)\left(\frac{l}{2}+z\right)e^{-jkR_2}\right]\cos\left(\frac{kl}{2}\right) - \left[\frac{1}{R_1}e^{-jkR_1} + \frac{1}{R_2}e^{-jkR_2}\right]\sin\left(\frac{kl}{2}\right)\right\};$$

wherein $R_1 = \sqrt{\rho^2 + (z-l/2)^2}$ and $R_2 = \sqrt{\rho^2 + (z+l/2)^2}$.

* * * * *